3,334,085
NAPHTHOL DISAZO DYESTUFFS CONTAINING
PHENYLTHIOSULFATE GROUPS
Gordon A. Geselbracht, Charlotte, N.C., assignor to
Martin-Marietta Corporation, a corporation of Maryland
No Drawing. Filed Sept. 2, 1964, Ser. No. 394,049
8 Claims. (Cl. 260—185)

The present invention relates to dyestuffs, and more particularly to disazo dyestuffs, their metal complex compounds, and to a method for making same.

The dyestuffs of the present invention are characterized in that they are a member selected from the group of dyestuffs consisting of:

(1) disazo dyestuffs corresponding to the formula X—N=N—R—N=N—X, wherein X is a radical of the benzene series bearing a pendant thiosulfate group in a position selected from the group consisting of meta and para with respect to the adjacent azo group, and R is the radical of a naphthol, said naphthol radical bearing at least one hydroxy substituent in ortho position to an azo group;

(2) disazo dyestuffs as defined in subparagraph (1) hereof, and further characterized in that at least one of the radicals of the benzene series positioned ortho to said hydroxy substituent bears in ortho position to the adjoining azo group a group capable of forming a metal complex;

(3) chromium complexes of the disazo dyestuffs defined in subparagraph (2) hereof;

(4) cobalt complexes of the disazo dyestuffs defined in subparagraph (2) hereof;

(5) copper complexes of the disazo dyestuffs defined in subparagraph (2) hereof;

(6) nickel complexes of the disazo dyestuffs defined in subparagraph (2) hereof; and (7) iron complexes of the disazo dyestuffs defined in subparagraph (2) hereof.

The above pendant thiosulfate group may be a member selected from the group consisting of sodium thiosulfate, potassium thiosulfate, ammonium thiosulfate, and thiosulfuric acid.

The disazo dyestuffs of the present invention may be prepared by a process comprising the steps of coupling, under acid conditions, equimolar amounts of diazotized aminophenylthiosulfate selected from the group consisting of diazotized meta-aminophenylthiosulfates and diazotized paraaminophenylthiosulfates and a naphthol capable of coupling with two equivalent proportions of a diazonium salt, thereby forming a monoazo dyestuff; and then coupling, under alkaline conditions, equimolar amounts of the resulting monoazo dyestuff and a diazotized aminophenylthiosulfate selected from the group consisting of diazotized meta-aminophenylthiosulfates and diazotized para-aminophenylthiosulfates.

The naphthols suitable for use in the method of the present invention are those which are capable of coupling with two equivalent proportions of a diazonium salt, e.g. those naphthols which have two sites on the naphthol molecule at which reaction with a diazonium salt can occur. Illustrative examples of such naphthols follow:

8-amino-1-naphthol-3,6-disulfonic acid
6-amino-1-naphthol-3-sulfonic acid
6-anilino-1-naphthol-3-sulfonic acid
6-(4-nitro-m-toluamido)-1-naphthol-3-sulfonic acid
8-amino-1-naphthol-5-sulfonic acid
5-amino-1-naphthol-3-sulfonic acid
1-naphthol
1,5-naphthalenediol
1-naphthol-8-sulfonic acid
4,5-dihydroxy-1-naphthalenesulfonic acid
6,7-dihydroxy-2-naphthalenesulfonic acid
5-amino-1-naphthol
8-amino-2-naphthol, and
8-amino-1-naphthol.

Metal complexes of many of the disazo dyestuffs of the present invention may also be prepared. These complexes may be chromium, cobalt, copper, nickel or iron complexes.

In all of the non-metallized disazo dyestuffs of the present invention, at least one hydroxy substituent of the naphthol radical occurs ortho to an azo group; and when the radical of the diazotized aminophenylthiosulfate coupled ortho to said hydroxy substituent also has a metallizable group positioned ortho to said azo group, equivalent proportions of the disazo dyestuff and a salt of copper, nickel, iron, cobalt or chromium may be reacted to form a metal complex of the disazo dyestuff having a ratio of metal atoms to molecules of dye of 1:1. Thus, a 1:1 metal complex of a disazo dyestuff may be prepared by a process comprising the step of reacting equivalent amounts of a member selected from the group consisting of salts of copper, nickel, iron, cobalt and chromium and a disazo dyestuff of the formula

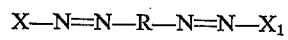

wherein X is a radical of the benzene series bearing a pendant thiosulfate group in a position selected from the group of positions consisting of meta and para with respect to the azo group adjoining X; R is the radical of a naphthol bearing a hydroxy substituent in ortho position to the azo group adjoining $X_1$; and $X_1$ is a radical of the benzene series bearing a pendant thiosulfate group in a position selected from the group consisting of meta and para with respect to the azo group adjoining $X_1$, said $X_1$ radical also bearing in ortho position to the adjoining azo group a group capable of forming a metal complex.

The non-metallized disazo dyestuffs described in the preceding paragraph may also be premetallized to form a metal complex of the disazo dyestuff in which the ratio of metal atoms to molecules of dye is 1:2, by reacting two equivalents of the non-metallized disazo dyestuff with one equivalent of a salt of Ni, Cr, or Co. Thus, a 1:2 metal complex of a disazo dyestuff may be prepared by a process comprising the step of reacting an equivalent amount of a member selected from the group consisting of salts of nickel, cobalt and chromium with two equivalent amounts of a disazo dyestuff of the formula

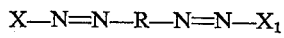

wherein X is a radical of the benzene series bearing a pendant thiosulfate group in a position selected from the group consisting of meta and para with respect to the azo group adjoining X; R is the radical of a naphthol bearing a hydroxy substituent in ortho position to the azo group adjoining $X_1$; $X_1$ is a radical of the benzene series bearing a pendant thiosulfate group in a position selected from a group of positions consisting of meta and para with respect to the azo group adjoining $X_1$, said $X_1$ radical also bearing in ortho position to the adjoining azo group capable of forming a metal complex.

In some of the non-metallized disazo dyestuffs of the present invention, for example those prepared from 1,5-naphthalenediol or 4,5-dihydroxy-1-naphthalenesulfonic acid or 6,7-dihydroxy-2-naphthalenesulfonic acid, a hydroxy substituent of the naphthol occurs ortho to each of the azo groups; and when the radicals of both diazotized aminophenylthiosulfates in these dyestuffs also have a metallizable group positioned ortho to their respective azo groups, an equivalent amount of the non-metallized disazo dyestuff and two equivalent amounts of a salt of copper, nickel, iron, cobalt or chromium may be reacted to form a metal complex of the disazo dyestuff having a ratio of metal atoms to dye molecules of 2:1. Thus, a 2:1 metal complex of a disazo dyestuff may be prepared by a process comprising the step of reacting two equivalent amounts of a member selected from the group consisting of salts of copper, nickel, iron, cobalt and chromium with one equivalent amount of a disazo dyestuff of the formula $X_1$—N=N—R—N=N—$X_1$, wherein R is the radical of a naphthol bearing a hydroxy substituent ortho to each of the azo groups; and $X_1$ is a radical of the benzene series bearing a pendant thiosulfate group in a position selected from the group of positions consisting of meta and para with respect to the adjacent azo group, said $X_1$ radical also bearing in ortho position to the adjoining azo bridge a group capable of forming a metal complex.

As used herein, the term non-metallized disazo dyestuff means a disazo dyestuff which has not been formed into a metal complex.

The dyestuffs of the present invention are suiatble for coloring fibers, and are excellently suitable for dyeing and printing cotton fabric. The dyeings obtained from the dyestuffs of the present invention are particularly characterized by their good wet fastness properties.

The dyestuffs of the present invention may be applied to cotton fabric by padding onto the fabric, at 140° F., a dye solution consisting of 20 parts dye, 100 parts thiourea, 2 parts sodium alginate migration inhibitor, 878 parts water, and if the thiosulfuric acid form of the dye is used enough soda ash to solubilize the dye; squeezing to 60% wet pick up based on fabric weight; pre-drying to 10% moisture content; and heating in a curing oven for 1 minute at 410° F. to fix the dye.

Printings may be made in similar manner. For example, a dispersion of the dyes of the present invention may be prepared from 20 parts dye, 2 parts dispersing agent, 4 parts diethyleneglycol, enough soda ash to render the composition alkaline, and 72 parts water. A printing paste may be prepared from 12.5 parts of the above dye dispersion, 10 parts urea, 5 parts thiourea, and 72.5 parts 12% aqueous corn starch thickener. The printing paste may be applied to cotton fabric, the fabric predried, and then heated in a curing oven at 410° F. for 1.5 minutes to fix the dye.

The following examples are given to illustrate the invention.

EXAMPLE 1

The black water soluble disazo dyestuff of the formula

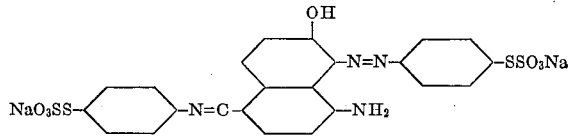

may be prepared as follows.

1 g.m.w. of sodium S-4-aminophenylthiosulfate is diazotized by dissolving 227 gms. sodium S-4-aminophenylthiosulfate in 500 ml. water, cooling to 0° C., adding 250 gms. muriatic acid 20° Bé., and adding 345 gms. 20% aqueous $NaNO_2$ at 0°–5° C., as consumed. Enough sulfamic acid, approximately 0.25–2 gms., is added to render the solution negative to starch-KI paper, thereby removing excess nitrous acid. The diazonium salt, partially in solution, results and is maintained at 0° C.

1 g.m.w. (159 gms.) 8-amino-2-naphthol and 125 gms. muriatic acid 20° Bé. are dissolved in 500 ml. water at 60° C. The solution is clarified by adding thereto 10 gms. activated charcoal, stirring, filtering, and recovering the filtrate. The filtrate is cooled to 0° C., and the above partial solution of diazonium salt at 0° C. is added thereto with stirring, and stirring is continued, while the temperature is permitted to rise to room temperature, until coupling is completed. Approximately 12 hours will be required for coupling to be completed; (completion of reaction is indicated by the absence of a violet coloration when a sample is spotted on filter paper, streaked with aqueous resorcinol, and an aqueous solution of soda ash added thereto). The resulting monoazo dyestuff, in which the coupling has occurred para to the amine of the aminonaphthol, is filtered and recovered as solids, and the solids washed with a 1% aqueous solution of HCl at room temperature to remove any unreacted 8-amino-2-naphthol, and recovered as wet press cake. The wet press cake is dissolved and rendered alkaline by adding it to 5 liters water and 1 g.m.w. (40 gms.) caustic soda at room temperature, diluting with water to 10 liters, and adding 2,000 gms. 20% aqueous soda ash. The solution of the monoazo dyestuff is cooled to 0° C.

Another g.m.w. of sodium S-4-aminophenylthiosulfate is diazotized as described above, and added, at 0° C. during a period of one hour to the above solution of the monoazo dyestuff. Stir the composition 1 hour at 0° C., and a solution of the sodium thiosulfate form of the disazo dyestuff results.

The disazo dyestuff product may be recovered by evaporating the solution of the sodium thiosulfate form of the dyestuff to dryness; or it may be recovered by adding enough NaCl to the solution to render the entire composition 10% NaCl by weight, recovering the resulting precipitate, and drying at 60° C.

If the potassium thiosulfate form of the disazo dyestuff is desired, equivalent amounts of potassium analogs may be substituted for the sodium compounds in the above procedure.

If the ammonium thiosulfate form of the disazo dyestuff is desired, the sodium or potassium thiosulfate form of the dyestuff may be neutralized with a mineral acid, such as HCl, the resulting precipitate washed with water, rendered alkaline with $NH_4OH$, and evaporated to dryness.

The thiosulfuric acid form of the dyestuff may be prepared by rendering a solution of the sodium, potassium, or ammonium thiosulfate form of the dyestuff slightly acid with a mineral acid, such as HCl, at room temperature, and collecting, washing and drying the resulting precipitate.

EXAMPLES 2–15

In the examples given in the following tables, the procedure is the same as that given under Example 1 above, and the examples in the table indicate that equimolar amounts of the diazonium salt prepared from the aminophenylthiosulfate in the second column and the naphthol in the third column are coupled, under acid conditions, and then rendered alkaline to form the monoazo dyestuff in the fourth column, and that equimolar amounts of the monoazo dyestuff and the diazonium salt prepared from the aminophenylthiosulfate in the fifth column are coupled, under alkaline conditions, finally resulting in the disazo dyestuff in the sixth column, having the color shown in the seventh column.

| Ex. No. | Aminophenyl-thiosulfate | Naphthol | Monoazo Dyestuff | Aminophenyl-thiosulfate | Disazo Dyestuff | Color |
|---|---|---|---|---|---|---|
| 2 | Sodium S-4-aminophenyl-thiosulfate | 8-amino-1-naphthol-5-sulfonic acid | (structure) | Sodium S-4-aminophenyl-thiosulfate | (structure) | Blue |
| 3 | Potassium S-(5-amino-2-chlorophenyl)thiosulfate | 8-amino-1-naphthol-3,6-disulfonic acid | (structure) | Potassium S-(5-amino-2-chlorophenyl)thiosulfate | (structure) | Navy Blue |
| 4 | Ammonium S-(5-amino-2-bromophenyl)thiosulfate | 6-amino-1-naphthol-3-sulfonic acid | (structure) | Ammonium S-(5-amino-2-bromophenyl)thiosulfate | (structure) | Bordeaux |
| 5 | Sodium S-(4-amino-3-fluorophenyl)thiosulfate | 6-anilino-1-naphthol-3-sulfonic acid | (structure) | Sodium S-(4-amino-3-fluorophenyl)thiosulfate | (structure) | Do. |
| 6 | Sodium S-(3-amino-4-methylphenyl)thiosulfate | 6-(4-nitro-m-toluamido)-1-naphthol-3-sulfonic acid | (structure) | Sodium S-(3-amino-4-methylphenyl)thiosulfate | (structure) | Do. |

| Ex. No. | Aminophenyl-thiosulfate | Naphthol | Monoazo Dyestuff | Aminophenyl-thiosulfate | Disazo Dyestuff | Color |
|---|---|---|---|---|---|---|
| 7 | Potassium S-(3-amino-5-ethyl-phenyl)thiosulfate | 5-amino-1-naphthol-3-sulfonic acid | 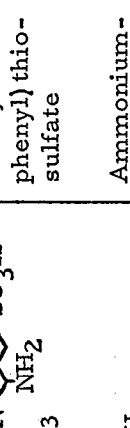 | Potassium S-(3-amino-5-ethyl-phenyl)thiosulfate | 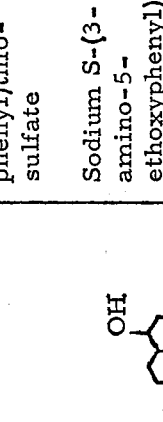 | Bordeaux |
| 8 | Ammonium S-(4-amino-3-methoxy-phenyl)thiosulfate | 1-naphthol | 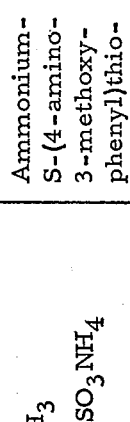 | Ammonium S-(4-amino-3-methoxy-phenyl)thiosulfate | 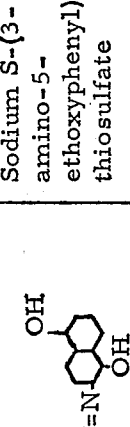 | Brown |
| 9 | Sodium S-(3-amino-5-ethoxyphenyl)thiosulfate | 1,5-naphthalene-diol | 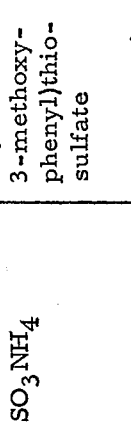 | Sodium S-(3-amino-5-ethoxyphenyl)thiosulfate | 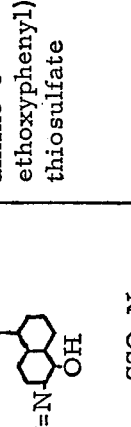 | Olive |
| 10 | Sodium S-(5-amino-2-sulfonamido-phenyl)thiosulfate | 1-naphthol-8-sulfonic acid | 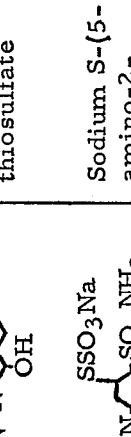 | Sodium S-(5-amino-2-sulfonamido-phenyl)thiosulfate | 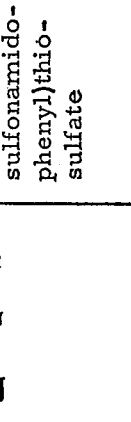 | Violet |
| 11 | Potassium S-(2-phenyl-sulfonamido-4-amino-phenyl)thiosulfate | 4,5-dihydroxy-1-naphthalenesulfonic acid | 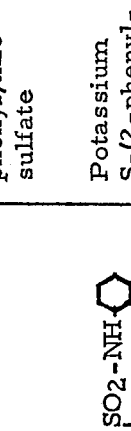 | Potassium S-(2-phenyl-sulfonamido-4-amino-phenyl)thiosulfate | 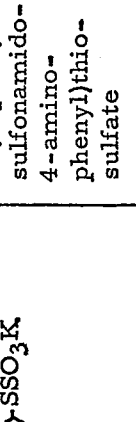 | Blue |

| Ex. No. | Aminophenyl-thiosulfate | Naphthol | Monoazo Dyestuff | Aminophenyl-thiosulfate | Disazo Dyestuff | Color |
|---|---|---|---|---|---|---|
| 12 | Ammonium S-(4-amino-3-hydroxyphenyl)thiosulfate | 6,7-dihydroxy-2-naphthalenesulfonic acid | [structure: NH$_4$O$_3$SS–C$_6$H$_3$(OH)–N=N–naphthalene(HO)(HO)(SO$_3$NH$_4$)] | Ammonium S-(4-amino-3-hydroxyphenyl)thiosulfate | [structure with N=N–C$_6$H$_3$(OH)(SSO$_3$NH$_4$)] | Bordeaux |
| 13 | Sodium S-(4-amino-3-sodiocarboxyphenyl)thiosulfate | 5-amino-1-naphthol | [structure: NaO$_3$SS–C$_6$H$_3$(NaOOC)–N=N–naphthalene(OH)(NH$_2$)] | Sodium S-(4-amino-3-sodiocarboxyphenyl)thiosulfate | [structure: HO$_3$SS–C$_6$H$_3$(HOOC)–N=N–naphthalene(OH)(NH$_2$)–N=N–C$_6$H$_3$(SSO$_3$H)(COOH)] | Blue |
| 14 | Sodium S-4-aminophenyl-thiosulfate | 8-amino-1-naphthol | [structure: NaO$_3$SS–C$_6$H$_4$–N=N–naphthalene(H$_2$N)(OH)] | Sodium S-4-aminophenyl-thiosulfate | [structure: H$_2$N OH naphthalene with N=N–C$_6$H$_4$–SSO$_3$Na on each side] | Blue |
| 15 | Do. | 6-amino-1-naphthol-3-sulfonic acid | [structure: NaO$_3$SS–C$_6$H$_4$–N=N–naphthalene(H$_2$N)(OH)(SO$_3$Na)] | Do. | [structure: H$_2$N OH naphthalene(SO$_3$Na) with N=N–C$_6$H$_4$–SSO$_3$Na groups, NaO$_3$SS–C$_6$H$_4$–N=N–] | Violet |

EXAMPLE 16

The blue premetallized dyestuff of the formula

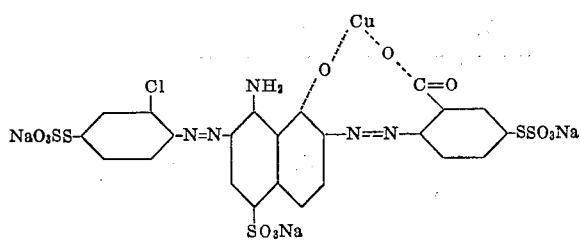

may be prepared as follows.

1 g.m.w. of diazotized sodium S-(3-chloro-4-aminophenyl)thiosulfate is coupled with 1 g.m.w. of 8-amino-1-naphthol-5-sulfonic acid to form a monoazo dyestuff, and the resulting monoazo dyestuff is coupled with 1 g.m.w. of diazotized sodium S-(3-sodiocarboxy-4-aminophenyl)thiosulfate to form a disazo dyestuff, in the manner described in Example 1 above.

1 g.m.w. of the resulting disazo dyestuff is premetallized as follows. Add the disazo dyestuff to 10 liters of water and heat to 80° C. Add thereto a copper sulphate solution which has been prepared by dissolving 249.71 gms. copper sulphate pentahydrate in 3 liters of water at 90° C., cooling to 25° C., and redissolving with 1,000 gms. 28% aqueous ammonia. The composition is heated at 80° C. for 2 hours, and the metallized dyestuff separates on salting with NaCl.

EXAMPLE 17

The grey premetallized dyestuff of the formula

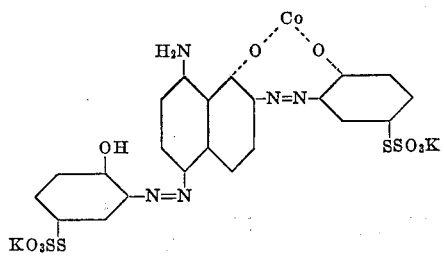

may be prepared as follows.

1 g.m.w. of diazotized potassium S-(3-amino-4-hydroxyphenyl)thiosulfate is coupled with 1 g.m.w. of 8-amino-1-naphthol to form a monoazo dyestuff, and the resulting monoazo dyestuff is coupled with 1 g.m.w. of diazotized potassium S-(3-amino-4-hydroxyphenyl)thiosulfate to form a disazo dyestuff, in the manner described in Example 1 above.

1 g.m.w. of the resulting disazo dyestuff is added to 10 liters water, and heated to 80° C. To it are added 281.1 gms. CoSO$_4$·7H$_2$O dissolved in 3 liters water, and the composition is heated at 80° C. for two hours. The metallized dyestuff separates on salting with KCl.

EXAMPLE 18

The grey premetallized dyestuff of the formula

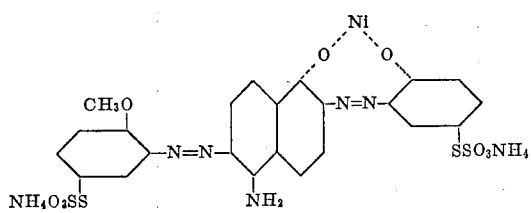

may be prepared as follows.

1 g.m.w. diazotized sodium S-(3-amino-4-methoxyphenyl)thiosulfate is coupled to 1 g.m.w. 5-amino-1-naphthol to form a monoazo dyestuff, the resulting monoazo dyestuff coupled to 1 g.m.w. diazotized sodium S-(3-amino-4-methoxyphenyl)thiosulfate to form a disazo dyestuff, and the disazo dyestuff converted to the ammonium thiosulfate form, as described in Example 1.

1 g.m.w. of the resulting disazo dyestuff is added to 10 liters water and heated to 80° C. To it are added 262.85 gms. NiSO$_4$·6H$_2$O dissolved in 3 liters water. The composition is heated at 80° C. for 2 hours. The metallized dyestuff may be recovered by evaporating to dryness.

EXAMPLE 19

The blue premetallized dyestuff of the formula

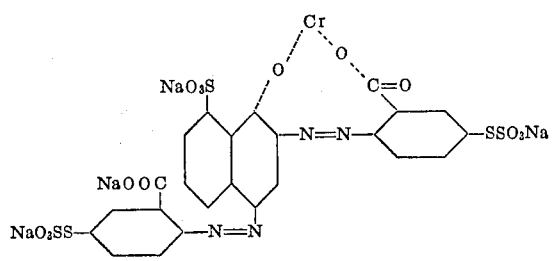

may be prepared as follows.

1 g.m.w. of diazotized sodium S-(4-amino-3-sodiocarboxyphenyl)thiosulfate is coupled with 1 g.m.w. 1-naphthol-8-sulfonic acid to form a monoazo dyestuff, and the monoazo dyestuff is coupled with 1 g.m.w. diazotized sodium S-(4-amino-3-sodiocarboxyphenyl)thiosulfate to form a disazo dyestuff, in the manner described in Example 1 above.

1 g.m.w. of the resulting disazo dyestuff is added to 10 liters water and heated to 60° C. To it are added 594.32 gms. of a 50% aqueous solution of chromium acetate monohydrate. The composition is heated at 80° C. for 2 hours. The metallized dyestuff separates on salting with NaCl.

EXAMPLE 20

The olive premetallized dyestuff of the formula

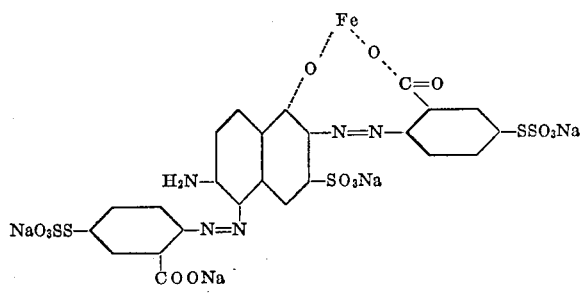

may be prepared as follows.

1 g.m.w. of diazotized sodium S(4-amino-3-sodiocarboxyphenyl) thiosulfate is coupled with 1 g.m.w. of 6-amino-1-naphthol-3-sulfonic acid to form a monoazo dyestuff, and the monoazo dyestuff is coupled with 1 g.m.w. of diazotized sodium S-(4-amino-3-sodiocarboxyphenyl) thiosulfate to form a disazo dyestuff, in the manner described in Example 1 above.

1 g.m.w. of the disazo dyestuff is premetallized by adding thereto 10 liters water and also 162.21 gms. FeCl$_3$ dissolved in 3 liters water, heating to 80° C., and holding at 80° C. for 2 hours while maintaining pH 7 by adding caustic soda as needed. The metallized dyestuff separates on salting with NaCl.

EXAMPLE 21

The blue premetallized dyestuff of the formula

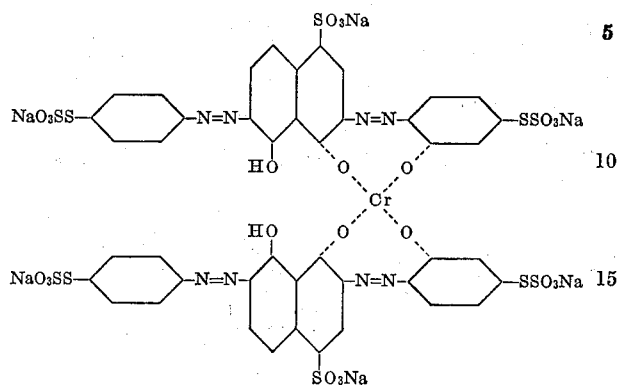

may be prepared as follows.

2 g.m.w. of diazotized sodium S-4-aminophenylthiosulfate are coupled with 2 g.m.w. of 4,5-dihydroxy-1-naphthalenesulfonic acid to form a monoazo dyestuff, and the resulting monoazo dyestuff is coupled with 2 g.m.w. of diazotized sodium S-(3-hydroxy-4-aminophenyl)thiosulfate to form a disazo dyestuff in the manner described in Example 1 above.

2 g.m.w. of the resulting disazo dyestuff is premetallized as follows. Add the disazo dyestuff to 20 liters of water at 60° C. To it are added 594.32 gms. of a 50% aqueous solution of chromium acetate, and the composition is heated at 80° C. for 2 hours while maintaining pH 7. The metallized dyestuff separates on salting with NaCl.

EXAMPLE 22

The grey premetallized dyestuff of the formula

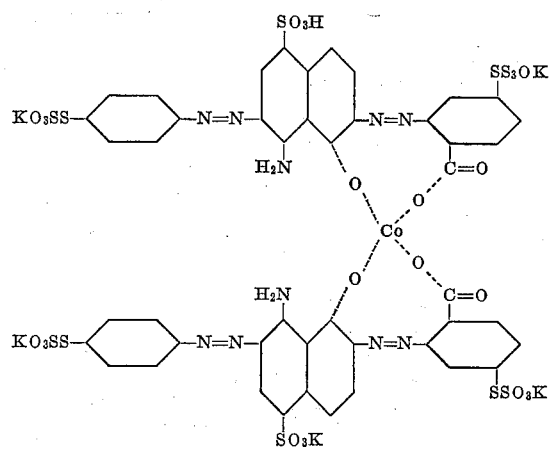

may be prepared as follows.

2 g.m.w. of diazotized potassium S-4-aminophenylthiosulfate are coupled with 2 g.m.w. of 8-amino-1-naphthol-5-sulfonic acid to form a monoazo dyestuff, and the resulting monoazo dyestuff is coupled with 2 g.m.w. diazotized potassium S-(3-amino-4-potassiocarboxyphenyl)thiosulfate to form a disazo dyestuff, in the manner described in Example 1, above.

The resulting disazo dyestuff is premetallized as follows. 2 g.m.w. of the disazo dyestuff are added to 20 liters water and heated to 80° C. To it are added 281.1 gms.

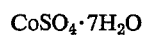

dissolved in 3 liters water, and the result is heated at 80° C. for 2 hours. The metallized dyestuff separates on salting with KCl.

EXAMPLE 23

The blue premetallized dyestuff of the formula

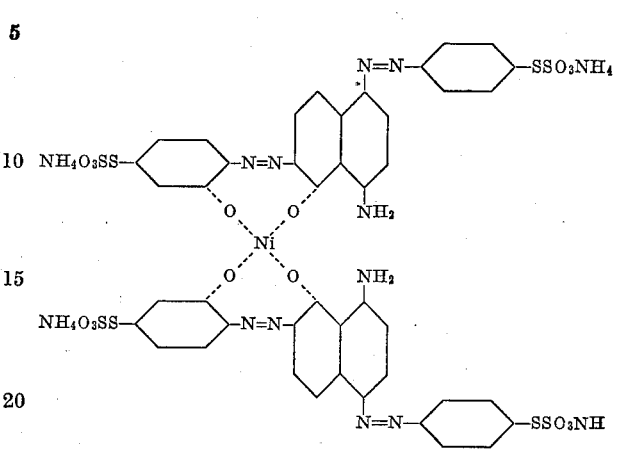

may be prepared as follows.

2 g.m.w. of diazotized sodium S-4-aminophenylthiosulfate are coupled with 2 g.m.w. of 8-amino-1-naphthol to form a monoazo dyestuff, and the resulting monoazo dyestuff is coupled with 2 g.m.w. of diazotized sodium S-(4-amino-3-methoxyphenyl)thiosulfate to form a disazo dyestuff and the disazo dyestuff is converted to its ammonium salt form in the manner described in Example 1 above.

The disazo dyestuff is premetallized as follows. 2 g.m.w. of the resulting disazo dyestuff is added to 20 liters water and heated to 80° C. To it are added 262.85 gms.

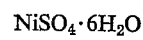

dissolved in 3 liters water. The composition is heated at 80° C for 2 hours. The metallized dyestuff separates on salting with NH₄Cl.

EXAMPLE 24

The grey premetallized dyestuff of the formula

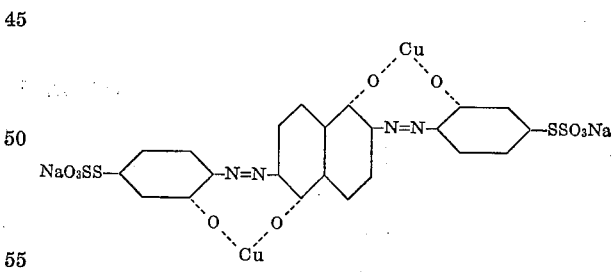

may be prepared as follows.

1 g.m.w. of diazotized sodium S-(4-amino-3-methoxyphenyl)thiosulfate is coupled with 1 g.m.w. of 1,5-naphthalenediol to form a monoazo dyestuff, and the resulting monoazo dyestuff is coupled with 1 g.m.w. of diazotized sodium S-(4-amino-3-methoxyphenyl)thiosulfate to form a diazo dyestuff, in the manner described in Example 1 above.

The disazo dyestuff is premetallized as follows. 1 g.m.w. of the disazo dyestuff is added to 10 liters water and heated to 80° C. To it is added a couper sulphate solution which has been prepared by dissolving 599.42 gms. copper sulphate pentahydrate in 6 liters of water at 90° C., cooling to 25° C., and redissolving with 2,000 gms. 28% aqueous ammonia. The composition is heated at 80° C. for 2 hours, and the metallized dyestuff separates on salting with NaCl.

EXAMPLE 25

The black premetallized dyestuff of the formula

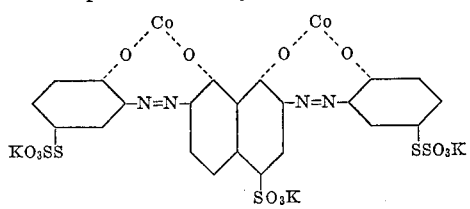

may be prepared as follows.

1 g.m.w. of diazotized potassium S-(3-amino-4-hydroxyphenyl)thiosulfate is coupled with 1 g.m.w. of 4,5-dihydroxy-1-naphthalenesulfonic acid to form a monoazo dyestuff and the resulting monoazo dyestuff is coupled with 1 g.m.w. of diazotized potassium S-(3-amino-4-hydroxyphenyl)thiosulfate to form a disazo dyestuff, in the manner described in Example 1 above.

The disazo dyestuff is premetallized as follows. 1 g.m.w. of the resulting disazo dyestuff is added to 10 liters of water and heated to 80° C. To it are added 562.2 gms. $CoSO_4 \cdot 7H_2O$ dissolved in 6 liters water, and the result heated at 80° C. for 2 hours. The premetallized dyestuff separates on salting with KCl.

EXAMPLE 26

The grey premetallized dyestuff of the formula

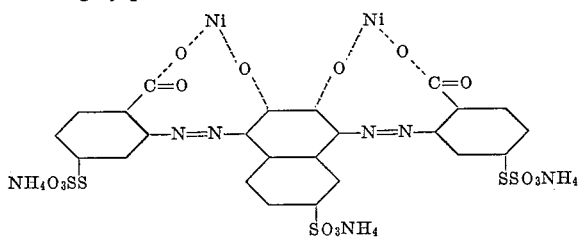

may be prepared as follows.

1 g.m.w. of diazotized sodium S-(3-amino-4-sodiocarboxyphenyl)thiosulfate is coupled with 1 g.m.w. of 6,7-dihydroxy-2-naphthalenesulfonic acid to form a monoazo dyestuff, and the resulting monoazo dyestuff is coupled with 1 g.m.w. diazotized sodium S-(3-amino-4-sodiocarboxyphenyl)thiosulfate to form a disazo dyestuff, and the disazo dyestuff is converted to its ammonium salt form in the manner described in Example 1 above.

The disazo dyestuff is premetallized as follows. 1 g.m.w. of the disazo dye is added to 10 liters water and heated to 80° C. To it are added 525.7 gms. $NiSO_4 \cdot 6H_2O$ dissolved in 6 liters water. The composition is heated to 80° C. for 2 hours. The metallized dyestuff separates on salting with $NH_4Cl$.

EXAMPLE 27

The brown premetallized dyetsuff of the formula

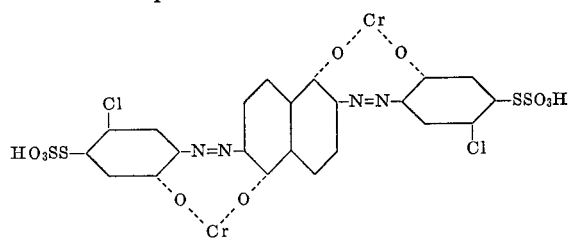

may be prepared as follows.

1 g.m.w. of diazotized sodium S-(4-amino-2-chloro-5-methoxyphenyl)thiosulfate is coupled with 1 g.m.w. 1,5-naphthalenediol to form a monoazo dyestuff, and the resulting monoazo dyestuff is coupled with 1 g.m.w. sodium S - (4-amino-2-chloro-5-methoxyphenyl)thiosulfate to form a disazo dyestuff, in the manner described in Example 1 above.

The disazo dyestuff is premetallized as follows. 1 g.m.w. of the disazo dyestuff is added to 10 liters water at 60° C. To it are added 1,188 gms. of a 50% aqueous solution of chromium acetate monohydrate, and the composition is heated at 80° C. for 2 hours while maintaining pH 7. The sodium salt form of the dyestuff separates on salting with NaCl, and is rendered slightly acid at room temperature with 0.1 N NCl to convert it to the acid form.

EXAMPLE 28

The olive premetallized dyestuff of the formula

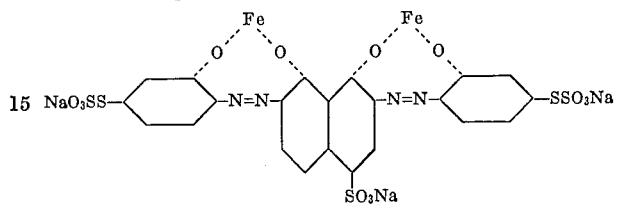

may be prepared as follows.

1 g.m.w. of diazotized sodium S-(4-amino-3-methoxyphenyl)thiosulfate is coupled with 1 g.m.w. of 4,5-dihydroxy-1-naphthalenesulfonic acid to form a monoazo dyestuff and the resulting monoazo dyestuff is coupled with 1 g.m.w. of sodium S-(4-amino-3-methoxyphenyl)thiosulfate to form a disazo dyestuff, in the manner described in Example 1 above.

The disazo dyestuff is premetallized as follows. To 1 g.m.w. of the disazo dyestuff is added 10 liters water and also 324.42 gms. $FeCl_3$ dissolved in 6 liters water. The composition is heated to 80° C. and held at 80° C. for 2 hours while adding caustic soda as needed to maintain pH 7. The metallized dyestuff separates on salting with NaCl.

What is claimed is:

1. A disazo dyestuff of the formula

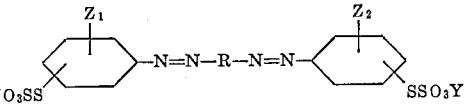

wherein

Y is H, Na, K or $NH_4$;

$Z_1$ and $Z_2$ are H, Cl, Br, F, $CH_3$, $CH_3CH_2$, $CH_3O$, $CH_3CH_2O$, $SO_2NH_2$,

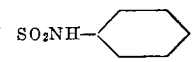

OH, or COOH and may be the same or different;

R is the radical of a naphthol selected from the group consisting of 8-amino-1-naphthol-3,6-disulfonic acid, 6-amino - 1 - naphthol - 3 - sulfonic acid, 6-anilino-1-naphthol - 3 - sulfonic acid, 6 - (4 - nitro - m - toluamido) - 1 - naphthol - 3 - sulfonic acid, 8 - amino - 1-naphthol - 5 - sulfonic acid, 5 - amino - 1 - naphthol-3 - sulfonic acid, 1-naphthol, 1,5-naphthalenediol, 1-naphthol - 8 - sulfonic acid, 4,5 - dihydroxy - 1 - naphthalenesulfonic acid, 6,7 - dihydroxy - 2 - naphthalenesulfonic acid, 5 - amino - 1 - naphthol, 8 - amino - 2-naphthol, 8-amino-1-naphthol, and the corresponding Na, K, and $NH_4$ salts of said sulfonic acids in which Na, K, and $NH_4$ are the same as Y;

and further characterized in that each —$SO_3Y$ group is located meta or para to the azo group attached to the same benzene ring as the —$SO_3Y$, and in that at least one of said azo groups is located ortho to a hydroxy substituent of the naphthol.

2. A disazo dyestuff as defined in claim 1, and further characterized in that $Z_2$ is OH, COOH, $CH_3O$ or $CH_3CH_2O$ and is located ortho to the azo group attached to the same benzene ring as $Z_2$, and still further characterized in that the last mentioned azo group is ortho to a hydroxy substituent of the naphthol.

3. 1:1 copper, 1:1 cobalt, 1:1 nickel, 1:1 chromium,

1:1 iron, 1:2 nickel, 1:2 cobalt, or 1:2 chromium complexes of the disazo dyestuff defined in claim 2.

4. A disazo dyestuff as defined in claim 1, and further characterized in that $Z_1$ and $Z_2$ are $CH_3O$, $CH_3CH_2O$, OH, or COOH and may be the same or different, and in that $Z_1$ and $Z_2$ are located ortho to the azo group attached to the same benzene ring as $Z_1$ and $Z_2$ respectively, and in that R is the radical of a naphthol selected from the group consisting of 1,5-naphthalenediol, 4,5 - dihydroxy - 1 - naphthalenesulfonic acid, 6,7 - dihydroxy - 2 - naphthalenesulfonic acid or the corresponding Na, K and $NH_4$ salts of said sulfonic acids in which Na, K, and $NH_4$ are the same as Y, and still further characterized in that both of the azo groups are located ortho to different hydroxy substituents of the naphthol radical.

5. 2:1 nickel, 2:1 iron, 2:1 cobalt or 2:1 chromium complexes of the disazo dyestuffs defined in claim 4.

6. The disazo dyestuff of the formula

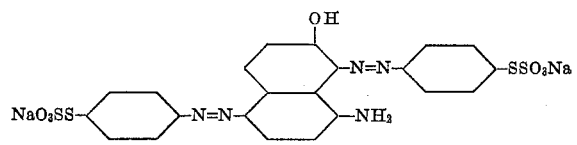

7. The disazo dyestuff of the formula

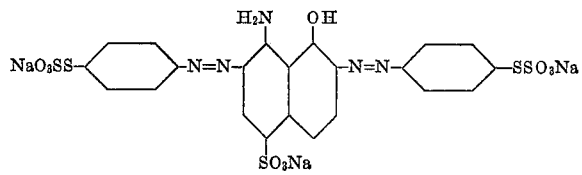

8. The disazo dyestuff of the formula

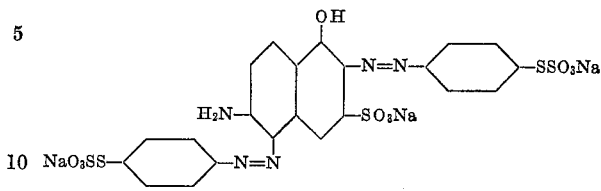

References Cited

UNITED STATES PATENTS

| | | | |
|---|---|---|---|
| 2,160,448 | 5/1939 | Wehrli | 260—145 |
| 2,200,445 | 5/1940 | Fellmer | 260—145 |
| 2,220,396 | 11/1940 | Crossley et al. | 260—145 |
| 2,756,223 | 7/1956 | Schetty | 260—145 |
| 2,804,454 | 8/1957 | Beffa | 260—145 |
| 2,806,760 | 9/1957 | Brassel et al. | |
| 2,931,693 | 4/1960 | Bailey et al. | 260—187 X |
| 3,088,790 | 5/1963 | Schultheis et al. | 260—314.5 X |
| 3,128,267 | 4/1964 | Schmitz et al. | 260—148 |

CHARLES B. PARKER, *Primary Examiner.*

F. D. HIGEL, *Assistant Examiner.*

UNITED STATES PATENT OFFICE
CERTIFICATE OF CORRECTION

Patent No. 3,334,085                          August 1, 1967

Gordon A. Geselbracht

It is hereby certified that error appears in the above numbered patent requiring correction and that the said Letters Patent should read as corrected below.

Column 3, in the structural formula, about line 72, for "N=C" read -- N=N --; column 13, in the structural formula, about line 41, for "SO$_3$H" read -- SO$_3$K --; same structural formula, about line 43, for "SS$_3$OK" read -- SSO$_3$K --; column 14, in the structural formula, about line 21, for "-SSO$_3$NH" read -- -SSO$_3$NH$_4$ --; column 15, line 50, for "NiSo$_4$" read -- NiSO$_4$ --.

Signed and sealed this 2nd day of July 1968.

(SEAL)
Attest:

Edward M. Fletcher, Jr.                          EDWARD J. BRENNER
Attesting Officer                               Commissioner of Patents